United States Patent [19]

Yamamoto et al.

[11] Patent Number: 4,612,364

[45] Date of Patent: Sep. 16, 1986

[54] METHOD FOR PRODUCING FORMED PRODUCT OF HIGH MOLECULAR COMPOUNDS

[75] Inventors: Masaki Yamamoto; Shigeyuki Takada, both of Osaka, Japan

[73] Assignee: Takeda Chemical Industries, Osaka, Japan

[21] Appl. No.: 779,975

[22] Filed: Sep. 25, 1985

[30] Foreign Application Priority Data

Oct. 5, 1984 [JP] Japan .................................. 59-210197
Sep. 5, 1985 [JP] Japan .................................. 60-197470

[51] Int. Cl.$^4$ ............................................. C08G 63/70
[52] U.S. Cl. ..................................... 528/491; 264/4.3; 264/4.33; 427/213.31; 427/213.35; 427/213.36; 528/493; 528/494; 528/495; 528/496; 528/497; 528/498
[58] Field of Search ............................... 264/4.3, 4.33; 427/213.31, 213.35, 213.36; 528/491, 493–498

[56] References Cited

U.S. PATENT DOCUMENTS

| 4,089,800 | 5/1978 | Temple | 264/4.3 X |
| 4,381,392 | 4/1983 | Pontoglio | 528/491 X |
| 4,389,330 | 6/1983 | Tice et al. | 427/213.36 |
| 4,443,497 | 4/1984 | Samejima et al. | 427/213.36 |

OTHER PUBLICATIONS

CPI Abstract of EP 117,411-A (BASF)

Primary Examiner—Lucille M. Phynes

[57] ABSTRACT

A formed product of a high molecular compound having a glass transition temperature of not more than about 60° C., which is substantially free of halogenated solvents harmful to the human body, is produced by mixing the high molecular compound, a halogenated solvent and an organic solvent other than the halogenated solvent which is compatible with the solvent and is less apt to dissolve the high molecular compound to prepare a solution and then maintaining the solution at a temperature around the boiling point of the halogenated solvent.

9 Claims, No Drawings

METHOD FOR PRODUCING FORMED PRODUCT OF HIGH MOLECULAR COMPOUNDS

This invention relates to a method for producing formed product of high molecular compounds having a glass transition temperature of not more than about 60° C. In more particular, the present invention is concerned with a method for producing formed product of the high molecular compounds, which method comprises using a halogenated solvent to produce formed product of the high molecular compounds, which is substantially free of the halogenated solvent.

Halogenated solvents are well known as good solvents for dissolving high molecular compounds. Also, they are non-flammable or practically non-flammable as compared with other organic solvents, which provides advantages in the production and contribute to their wide application.

However, halogenated solvents present hazards of liver disturbances, carcinogenicity and teratogenicity, thus these substances should be highly harmful to the human body, cause extremely increased tissue permeability, and are absorbable rapidly through any part of the human body.

In order to remove halogenated solvents having such characteristic properties after using halogenated solvents to produce the desired formed product, only the procedures of heating, reduction of pressure, etc. have been carried out. However, such procedures have the defect that halogenated solvents are poorly removed from the desired product.

The conventional procedures of heating, reduction of pressure, etc. can merely allow the halogenated solvents remaining in the said desired product to be removed gradually in accordance with their own definite half-life periods, and it is difficult practically to remove the halogenated solvent completely.

Furthermore, in the conventional procedure, the heating makes the product soften or melt, and, therefore, the characteristics of the product becomes changed.

The present inventors conducted intensive research on a method which permits substantial removal of the halogenated solvent used as a solvent and still remaining in the desired product, as described in the foregoing, and as a result, found that when an organic solvent other than the halogenated solvent which is compatible with the halogenated solvent and is less apt to dissolve a high molecular compound having a glass transition temperature of not more than about 60° C. is utilized as an auxiliary agent for removal and the resulting formed product is maintained at a temperature near to the boiling point of the said halogenated solvent, there can be obtained the formed product substantially free of the halogenated solvent. This finding was followed by further research, which has led to the completion of this invention.

This invention is directed to a method for producing a formed product of a high molecular compound which is substantially free of halogenated solvent, which comprises mixing (a) a high molecular compound having a glass transition temperature of not more than about 60° C., (b) a halogenated solvent and (c) an organic solvent other than the halogenated solvent which is compatible with the halogenated solvent and is less apt to dissolve the high molecular compound, to prepare a solution of the high molecular compound, and then maintaining the solution at a temperature around the boiling point of the halogenated solvent so as to remove the halogenated solvent.

As the high molecular compound employable in the present invention, one which has a glass transition temperature of not more than about 60° C. is employed, and one which has a glass transition temperature of not less than about 30° C. in preferable.

As to glass transition temperature, reference is made to "Rheology and its application", Renpei Goto et al., page 22, 1967, Kyoritsu Publishers, Japan.

The molecular weight of the high molecular compound is not limited, but it is preferable about 5000 to 30000.

Examples of the high molecular compound, which is usable in this invention, include for example polymers being soluble in halogenated solvents, such as polyester type compounds (e.g. polylactic acid, copolymer of lactic acid and glycolic acid), and waxes such as carnauba wax, paraffin and glycerides.

The halogenated solvents, which are employable in this invention, are preferably those having a boiling point of about 10° C. to 100° C. and having 1 to 6 halogen atoms and their examples include for example halogenated methane (e.g. methylene chloride, chloroform, carbon tetrachloride, trichloromonofluoromethane, difluorodibromomethane), halogenated ethane(e.g. ethyl chloride, ethyl bromide, 1,1,2-trifluoro-1,2,2-trichloroethane, s-tetrachlorodifluroethane, dibromodifluoroethane), ethylene chloride, ethylidene chloride, trichloroethylene, allyl chloride, isopropyl chloride and butyl chloride. In particular, halogenated methane is preferable, and methylene chloride is more preferable. The amount of halogenated solvent used is that which dissolve the high molecular compound or more than that.

The organic solvent (hereinafter referred to as "present auxiliary agent for removal") other than the halogenated solvents, which is compatible with the solvents to be used in this invention and is less apt to dissolve the high molecular compounds to be employed in this invention, may be any type of solvent, only if it possesses the above-described properties.

The present auxiliary agent for removal is preferably one having a boiling point within about ±50° C. from the boiling point of the above-mentioned halogenated solvent, preferably within about ±20° C.

The expression "compatible with the solvent" means substantially completely soluble in the said solvent.

The "expression less apt to dissolve the said high molecular compound" denotes that the present auxiliary agent for removal, alone, fails to dissolve the high molecular compound or has merely a solubility of not more than about 3% (V/V).

Specific examples of the present auxiliary agent for removal include for example straight-chain, branched-chain or cyclic hydrocarbons of 5 to 8 carbon atoms, ketones, ethers, esters and alcohols, and their boiling points are preferably about 10° to 100° C.

Representative examples of the said hydrocarbons include for example n-pentane, isopentane, n-hexane, cyclohexane, cyclohexene, benzene, pentene and hexene; representative examples of the said ketones for example acetone and methyl ethyl ketone; representative examples of the said ethers for example diethyl ether, methyl ethyl ether and tetrahydrofuran; representative examples of the said esters are for example ethyl acetate and methyl acetate, and representative examples of the said alcohols for example are methyl alcohol and ethyl alcohol, respectively.

The present auxiliary agent for removal may be added after the high molecular compound is dissolved in the halogenated solvent, or alternatively, may be mixed in advance with the solvent. Furthermore, it causes no inconvenience to add the present auxiliary agent for removal previously to the high molecular compound, etc., followed by addition of the solvent.

The amount of the present auxiliary agent employed in the present method for removal is not more than about 50% (V/V) based on the quantity of the halogenated solvent, preferably about 5 to 30% (V/V).

As the formed product obtained by using the solution of high molecular compound, there are mentioned for example film-like products, bar-shaped or block-shaped products, powders, film coating products on tablets or granules, microcapsules and microspheres.

The phrase "to maintain at a temperature around the boiling point of the halogenated solvent" as referred to in the process of this invention means a procedure of maintaining at a temperature within about ±20° C. of the boiling point of the halogenated solvent, more preferably at a temperature within about ±10° C. thereof.

In the maintaining at the above-described temperature, it is preferable to conduct such a procedure under reduced pressure, for example, under reduced pressure of not more than about 10 Torr, more preferably not more than about 1 Torr.

The above-described procedure may be conducted in a thermostatically-controlled vessel maintained under reduced pressure, fluidized vessel, moving bed or kiln.

Alternatively, the formed product may be maintained at the temperature in an air-tight sealed or closed system together with a substance (e.g., activated carbon, diatomaceous earth, etc.) capable of absorbing or adsorbing the halogenated solvent.

The length of time during which the above-described procedure is conducted is changed, depending upon the shape or form, thickness, surface area and treated amount of the formed product, the types and quantities of the solvent, the present auxiliary agent for removal and the pressure, and also varies according to the intended remaining amount, for example it is normally in the range of about 1 hour to 48 hours. The procedure continues till the formed product is substantially free of the halogenated solvent.

By following the above-described procedure, there is obtained formed product of high molecular compounds which is substantially free of the halogenated solvent. The expression "substantially free of" as mentioned above denotes concentration of not more than 1 ppm or below the sensitivity of detection as measured by a given detection apparatus, for example, gas chromatography equipped with ECD (electron capture detector).

The method according to this invention can produce formed product of the high molecular compound which is substantially free of halogenated solvent, and, therefore, the formed product is safe for humans. Furthermore, the present formed product brings less deformation with the lapse of time due to the decline of plastic deformation of the formed product per se in comparison with a formed product which retains a large amount of halogenated solvent. When the present formed product is stored in a packing system, the present formed product does not cause deterioration or denaturation of the packing material due to the evaporation of the halogenated solvent. Furthermore, it does not require any special machinery and equipment for the removal of the halogenated solvent in the production of the formed product of the high molecular compound on an industrial scale. Therefore, the method of this invention can be advantageously employed in producing formed product of the high molecular compound on an industrial scale.

The examples are described below to illustrate this invention more concretely.

EXAMPLE 1

In a mixed solution comprising 5 ml of methylene chloride and 1 ml of n-pentane was dissolved 4 g of polylactic acid (average molecular weight: about 20000, glass transition temperature: about 48° to 53° C.), and the mixture was formed into a film on a Teflon plate, followed by air-drying for 24 hours. Subsequently, the formed film was placed under the conditions of 0.2 Torr and 42° C. to remove the solvent. The remaining amount of methylene chloride as determined is shown in the following table.

| Conditions | Time | Remaining amount |
| --- | --- | --- |
| 42° C., 0.2 Torr | 0 | 18000 ppm |
| | 6 | 100 ppm |
| | 12 | Not detected |
| | 24 | Not detected |
| | 48 | Not detected |
| | 96 | Not detected |

The measurement of the remaining amount of the solvent was carried out by gas chromatography equipped with ECD. The same shall apply in the Examples to be described in the following.

EXAMPLE 2

In a mixed solution comprising 100 parts of carbon tetrachloride and 30 parts of cyclohexene was dissolved 20 parts of polylactic acid (average molecular weight: about 20000, glass transition temperature: about 48° to 53° C.), and after the solution was filtered to remove foreign matters, etc., the solvent was evaporated by aeration. Subsequently, removal of the solvent was carried out at 0.1 Torr and at 80° C. for 18 hours, and the molten polylactic acid was cooled and pulverized to give powdered polylactic acid. It showed a remaining amount of carbon tetrachloride of not more than 1 ppm.

EXAMPLE 3

In a hexagonal inclined revolving granulation machine was charged 2 kg of nonpareil spherical granules (32 to 28 mesh) produced from granulated sugar and corn starch, and the nonpareil granules were coated by a spray gun, with a solution of 100 g of n-paraffin (average molecular weight: about 500 to 600, glass transition temperature: about 50° C.) in a mixed solution comprising 700 ml of chloroform and 300 ml of methanol at 50° C. The resulting spherical coated granules were mixed with 20 g of talc, and forced-air dried with warm air at 52° C. for 24 hours. As a result, the granules showed a remaining amount of chloroform of not more than 1 ppm.

EXAMPLE 4

In 2.5 ml of a 20% aqueous gelatin solution warmed (at 60° to 70° C.) in advance to convert to the liquid form was dissolved 200 mg of TAP-144 [an acetate of peptide represented by the formula (Pyr)Glu-His-Trp-Ser-Tyr-D-Leu-Leu-Arg-Pro-NH-CH$_2$CH$_3$ which possesses an action similar to that of luteinizing hormone-releasing hormone (LH-RH). The abbreviations used are in accordance with IUPAC-IUB Commission on Biochemical Nomenclature. Optical isomers of the amino acids refer to the L-isomer, unless otherwise specified], and the solution was added to 20% of a lactic acid-glycolic acid copolymer [average molecular weight: 14,000, a monomer ratio of lactic acid to glycolic acid: 75/25 (on a weight basis), glass transition temperature: about 40° to 45° C.] in a mixed solution comprising 10 ml of methylene chloride and 3 ml of n-pentane, followed by ultrasonic treatment (20 KHz, 100 W for several minutes by use of a ultrasonic cell homogenizer, produced by Ohtake Seisakusho, Ltd., Japan) to prepare an adequately fine W/O emulsion. The emulsion was immediately cooled with ice to solidify the gelatin phase and poured into 1000 ml of 0.5% polyvinyl alcohol (Gohsenol EG-40, produced by Nippon Synthetic Chemical Industry Co., Ltd., Japan) cooled in advance with ice, followed by dispersion in a homogenizer having 80 μm punching metals at 3000 r.p.m. for 60 seconds to prepare a W/O/W emulsion. The emulsion was transferred rapidly into a rotary evaporator, whereby methylene chloride and n-pentane were removed under ice-cooling. After no bubbling was observed to take place, the residual solution was gradually warmed up to 30° to 40° C. in a constant-temperature water bath to remove the organic solvent. The solid matter was collected by filtration through a glass filter, rinsed five times with 10 ml of distilled water, spread over a glass dish, dried under reduced pressure (0.2 Torr) at 40° C. for 24 hours, and sieved through a screen of 100 mesh* to produce microcapsules of TAP-144.

Note: * "mesh" is as specified by the Japanese Industrial Standard.

The microcapsules showed a remaining amount of methylene chloride of not more than 1 ppm.

EXAMPLE 5

To 160 g (1.5 mol) of 85% lactic acid aqueous solution was added 38 g (0.5 mol) of glycolic acid and the mixture was subjected to heating under reduced pressure in nitrogen gas stream at 100° to 150° C./350 to 30 mmHg stepwise for 6 hours with removing distilled water, and then the resultant was subjected to a condensation reaction at 175° C./6 to 5 mmHg for 36 hours to give lactic acid-glycolic acid copolymer [monomer ratio: 75/25 (on a weight basis), average molecular weight: 14000, glass transition temperature: about 40 to 45° C.].

In 10 ml of methylene chloride and 3 ml of n-pentane was dissolved 2 g of said lactic acid-glycolic acid copolymer which had been synthesized without catalyst.

To this solution was added 2.5 ml of 20% aqueous gelatin solution containing 200 mg of TAP-144 which had been previously liquified by warming at about 60° C., and the mixture was ultrasonicated (100W, a few minutes), the given microfine W/O emulsion was immediately cooled down at about 15° C. to cause gelation of the gelatin. This was then added to 1000 ml of 0.5% polyvinyl alcohol in distilled water solution and dispersed using a homogenizer having a punching metal of 80 μm pores for 60 seconds at 3000 r.p.m. to give a W/O/W emulsion. The emulsion was quickly transferred to a vessel in which the methylene chloride and n-pentane were desorbed under mixing with a propeller mixer for 2 hours. The emulsion was then filtered through millipore filter with 8 μm pores and rinsed 5 times with 100 ml of distilled water. It was then spread on a glass dish and allowed to dry at 40° C. under reduced pressure (0.2 Torr) for 24 hours. The product was sieved through a 100-mesh screen (Sieve opening: 147 μm) to give TAP-144 microcapsules for injection.

The microcapsules showed a remaining amount of methylene chloride of not more than 1 ppm.

EXAMPLE 6

In 1 ml of distilled water were dissolved 450 mg of Leuprolide (TAP-144) and 90 mg of gelatin to give an aqueous layer. In a mixed solvent of 6 ml methylene chloride and 1.5 ml of n-pentane was dissolved 4 g of a copolymer of lactic acid and glycolic acid [monomer ratio; lactic acid/glycolic acid =75/25 (on weight basis), average molecular weight: 14000, glass transition temperature: about 40° to 45° C.] to give a solution of oil phase. The aqueous phase was added dropwise to the oil phase in a turbine type mixer under stirring at room temperature.

On the other hand, 500 ml of a 15% aqueous solution of polyvinyl alcohol was cooled to 15° C., and into the aqueous solution of polyvinyl alcohol was gradually poured said W/O emulsion to give (W/O)/W emulsion.

The (W/O)/W emulsion was transformed into a rotary evaporator, whereby methylene chloride and n-pentane were removed under gradual stirring for 4 hours at room temperature, and the oil phase was hardened.

The hardened microcapsules were captured by centrifugation to give microcapsules. Thus obtained microcapsules were rinsed with water. They were then spread on a glass dish and allowed to dry at 40° C. under reduced pressure (0.2 Torr) for 24 hours, and lyophilized to give microcapsules in which Leuprolide (TAP-144) is incorporated.

The microcapsules showed a remaining amount of methylene chloride of not more than 1 ppm.

What we claim is:

1. A method for producing a formed product of a high molecular compound which is substantially free of halogenated solvent, which comprises mixing
   (a) a high molecular compound having a glass transition temperature of not more than about 60° C.,
   (b) a halogenated solvent with 1–6 halogen atoms of the class consisting of halogenated methane, halogenated ethane, ethyl chloride, ethylene chloride, ethylidene chloride, trichloroethylidene, allyl chloride, isopropyl chloride and butyl chloride, and
   (c) an organic solvent other than the halogenated solvent which is compatible with the halogenated solvent and is less apt to dissolve the said high molecular compound, to prepare a solution of the high molecular compound and then maintaining the high molecular compound, to boiling point of the halogenated solvent so as to remove the halogenated solvent.

2. A method as claimed in claim 1, wherein the high molecular compound is an ester type high molecular compound.

3. A method as claimed in claim 2, wherein the ester type high molecular compound is polylactic acid.

4. A method as claimed in claim 2, wherein the ester type high molecular compound is a copolymer of lactic acid and glycolic acid.

5. A method as claimed in claim 1, wherein the halogenated solvent is halogenated methane.

6. A method as claimed is claim 5, wherein the halogenated methane is methylene chloride.

7. A method as claimed in claim 1, wherein the organic solvent is a hydrocarbon.

8. A method as claimed in claim 7, wherein the hydrocarbon is n-pentane.

9. A method as claimed in claim 1, wherein the temperature around the boiling point of the halogenated solvent is a temperature within 20° C. of the boiling point of the halogenated solvent.

* * * * *